(12) United States Patent
Gruber et al.

(10) Patent No.: US 6,747,084 B2
(45) Date of Patent: Jun. 8, 2004

(54) PROCESS TO PREPARE PRESSURE-SENSITIVE HYBRID COMPOSITE LATEX ADHESIVES

(75) Inventors: Bruce Alan Gruber, Emmaus, PA (US); Frank Vito DiStefano, Macungie, PA (US)

(73) Assignee: Air Products Polymers, L.P., Allentown, PA (US)

( * ) Notice: Subject to any disclaimer, the term of this patent is extended or adjusted under 35 U.S.C. 154(b) by 52 days.

(21) Appl. No.: 10/262,429

(22) Filed: Sep. 30, 2002

(65) Prior Publication Data

US 2004/0063842 A1 Apr. 1, 2004

(51) Int. Cl.[7] ................. C09J 151/06; C09J 125/04; C09J 133/06; C09J 133/12
(52) U.S. Cl. ................. 524/458; 524/560; 526/201; 526/328; 526/329.7
(58) Field of Search ................. 524/458, 560; 526/201, 328, 329.7

(56) References Cited

U.S. PATENT DOCUMENTS

| | | | |
|---|---|---|---|
| 5,013,784 A | | 5/1991 | Yang |
| 5,057,569 A | * | 10/1991 | Biale ............ 524/457 |
| 5,202,375 A | * | 4/1993 | Biale ............ 524/562 |
| 5,686,518 A | | 11/1997 | Fontenot et al. ......... 524/458 |
| 6,225,401 B1 | | 5/2001 | Rehmer et al. .......... 524/800 |
| 6,254,985 B1 | | 7/2001 | Gerst et al. ........ 428/355 EN |

FOREIGN PATENT DOCUMENTS

| | | | |
|---|---|---|---|
| EP | 0 554 832 A | 8/1993 | |
| EP | 0593231 | 4/1994 | .......... C09J/201/00 |

OTHER PUBLICATIONS

Hidalgo, et al. "Polystyrene(1)/poly(butyl acrylate-methacrylic acid)(2) core-shell emulsion polymers. Part II: Thermomechanical properties of latex films," *Colloid and Polymer Science*, 1992, vol. 270, pp. 1208–1221.

Jeong, et al. "Hybrid Composite Latexes," (Department of Chemical Engineering and Emulsion Polymers Institute, Lehigh University, Bethlehem, PA 18015, USA), *Polymeric Materials Science and Engineering*, 82, 305–306 (English) 2000.

* cited by examiner

Primary Examiner—Kelechi C. Egwim
(74) Attorney, Agent, or Firm—Mary E. Bongiorno

(57) ABSTRACT

The invention is directed to an improvement in a process for preparing an aqueous emulsion of pressure-sensitive adhesive based upon acrylic esters having a good balance of adhesive and cohesive properties and to the resulting emulsion. In the basic process, a pressure-sensitive adhesive formulation comprised of at least one ester of acrylic or methacrylic acid is polymerized in the presence of water and an emulsifier thereby forming an emulsion polymerized pressure-sensitive adhesive. The improvement resides in effecting the polymerization of the pressure-sensitive adhesive formulation comprised of at least one ester of acrylic or methacrylic acid in the presence of from 5 to 30 percent by weight of a styrene containing polymer containing at least 80 percent by weight styrene.

6 Claims, No Drawings

PROCESS TO PREPARE PRESSURE-SENSITIVE HYBRID COMPOSITE LATEX ADHESIVES

BACKGROUND OF THE INVENTION

Pressure-sensitive adhesives (sometimes referred to as PSA) which are permanently tacky in dry form at room temperature are widely used for making labels and tapes which can be applied to a variety of substrates and adhere on application of slight pressure. They are also used for laminating polymeric films such as poly(vinyl chloride) and polyester Mylar, silicone coated papers, and film release liners for forming decals and other related products.

Water based pressure-sensitive adhesives are of interest because of their low VOC emissions. Although the performance is not equivalent to solvent based pressure-sensitive adhesives, they satisfy emission standards and are easy to process. Common types of pressure-sensitive adhesives, both water based and solvent based, are derived from acrylic ester based copolymers, such as alkyl acrylate and alkyl methacrylate copolymers.

The following patents and articles are representative of acrylic based pressure-sensitive adhesives:

Hidalgo, et al. "Polystyrene(1)/poly(butyl acrylate-methacrylic acid)(2) core-shell emulsion polymers. Part II: Thermomechanical properties of latex films," *Colloid and Polymer Science*, 1992, Vol. 270, pages 1208–1221, disclose the formation of polystyrene/poly(butyl acrylate-methacrylic acid) latexes by a two stage process. Initially, a polystyrene seed is prepared and then the butyl acrylate and methacrylic acid polymerized in the presence of the seed forming a core/shell polymer in a ratio of 2/3.

EP 0 593231 A1 discloses the formation of pressure-sensitive acrylic adhesives by the addition of low molecular weight (<7,000) ethylene oxide-block-propylene oxide copolymer surfactants to acrylic pressure-sensitive adhesives for the purpose of improving low temperature adhesion. These pressure-sensitive adhesives are based upon 2-ethylhexyl acrylate and acrylic and methacrylic esters of $C_{4-12}$ alkanols, such as butyl acrylate.

U.S. Pat. No. 6,225,401 discloses filterable aqueous dispersions of pressure-sensitive adhesive suited for labels formed by copolymerizing acrylic or methacrylic esters in the presence of an inhibitor. A wide variety of hardening comonomers can be included in the emulsion polymerization process and these include the styrenes, acrylonitrile, vinyl esters, and so forth.

U.S. Pat. No. 6,254,985 discloses aqueous emulsions of pressure-sensitive adhesives base upon esters of acrylic and methacrylic acid. The patentees disclose the use of an emulsifier consisting of at least 5% by weight of aromatic carbon atoms, typically including at least two sulfonate groups to improve adhesion and cohesion.

BRIEF SUMMARY OF THE INVENTION

The present invention is directed to an improvement in a process for preparing an aqueous emulsion of a pressure-sensitive adhesive based upon acrylic esters which have a good balance of adhesive and cohesive properties and to the resulting emulsion. In the basic process, a pressure-sensitive adhesive formulation comprised of at least one ester of acrylic or methacrylic acid is polymerized in the presence of water and an emulsifier thereby forming an emulsion polymerized pressure-sensitive adhesive polymer. The improvement resides in effecting the polymerization of said pressure-sensitive adhesive formulation comprised of an ester of acrylic or methacrylic acid and a styrene containing polymer containing at least 80 percent by weight styrene, said styrene containing polymer present in an amount of from 5 to 30 percent by weight of the pressure-sensitive adhesive formulation.

Significant advantages of the process and product can be realized and they include:

an ability to include a small proportion of a low cost filler polymer into an aqueous pressure-sensitive adhesive based upon acrylic and methacrylic esters without adversely affecting the adhesive properties;

an ability to overcome deficiencies in film formation from blends of polymers, e.g., blends of polystyrene and acrylic and methacrylic copolymers;

an ability to include a low cost "filler" into a pressure-sensitive adhesive by a simple method without the need for special equipment;

an ability to prepare a pressure-sensitive adhesive with high Tg polystyrene filler in one reaction, and in a single reactor, while maintaining the performance advantages of the pressure-sensitive adhesive including those formed by the blend method; and, an ability to eliminate the need for the high Tg polystyrene latex to be of a specific particle size, expensive macromers, and minimum amounts of surfactants.

DETAILED DESCRIPTION OF THE INVENTION

Emulsion polymerization of a pressure-sensitive adhesive formulation comprised of esters of acrylic and methacrylic acid including ethylenically unsaturated monomers to produce aqueous based pressure-sensitive adhesive polymer emulsions is well known. A representative pressure-sensitive adhesive formulation is comprised of an aqueous polymer dispersion wherein the polymer is comprised of polymerized units, based on the total weight of units, of (a) from 60 to 95% by weight of at least one $C_{6-12}$ alkyl acrylate; (b) from 0 to 10% by weight of an ethylenically unsaturated compound having a glass transition temperature of above 0° C. and contain no functional groups other than ethylenically unsaturated group; (c) from 0 to 10% by weight of an ethylenically unsaturated compound having at least one acid or acid anhydride group; and (d) from 0 to 20% by weight of a further ethylenically unsaturated compound; the weight percentages based on the total weight of polymer. Typically, unsaturated compounds in group (c) and (d) are included at less than 5% each, when used. Thus, compounds in group (c) and (d) comprise a small proportion of the pressure-sensitive adhesive.

Particularly suitable alkyl acrylates in group (a) are 2-ethylhexyl acrylate, octyl acrylate, decyl acrylate or dodecyl acrylate.

Monomers in group (b) can include methyl methacrylate, methyl acrylate, n-butyl acrylate and tert-butyl acrylate; vinyl esters of $C_{1-20}$ carboxylic acids such as vinyl laurate, stearate, propionate, the vinyl ester of Versatic acid, and vinyl acetate; vinyl aromatics such as styrene, and so forth. Methyl methacrylate is preferred.

Examples of group (c) monomers can include acrylic and methacrylic acid, maleic acid, or maleic anhydride. Group (d) monomers can include $C_1$ to $C_{10}$ hydroxyalkyl (meth) acrylates.

There are two mechanisms in the process for forming the pressure-sensitive adhesive including the styrene containing polymer, e.g., polystyrene filler. In one mechanism, a styrene containing polymer is dissolved in a pressure-sensitive adhesive formulation comprised of a mixture of monomers. The resulting solution, then, is emulsified with surfactants and water and, with the aid of energy supplied by high shear mixing, converted to a stable emulsion of relatively small particle size particles. The resulting emulsion is polymerized by emulsion polymerization. In a second method, a seed latex of styrene polymer is prepared by emulsion polymerization and the pressure-sensitive adhesive formulation emulsion polymerized in the presence of the seed latex. The second method has the advantage of allowing for reduced emulsifier in the final product, elimination of high shear mixing and allowing the reaction to be carried out in a single reactor.

The styrene containing polymer is one containing at least 80% by weight styrene and typically one containing 100% styrene by weight. Optional monomers that may be included in producing styrene containing polymers are α-methyl styrene, ρ-methylstyrene, acrylonitrile, methacrylonitrile, methacrylonitrile, methyl methacrylate and trace levels of other monomers leading to a high Tg polymer, at least 80° C.

The styrene copolymer is incorporated into the pressure-sensitive adhesive in an amount from 5 to 30% by weight, which includes the base pressure-sensitive adhesive polymer and the styrene containing polymer. Levels above about 30% by weight detract from the performance of the pressure-sensitive adhesive. Levels below about 5% by weight, although not adversely affecting the properties of the pressure-sensitive adhesive, do not afford the low cost advantages. Preferably, the level of styrene copolymer is from 10 to 20% by weight.

Many of the pressure-sensitive adhesive formulations include styrene as a comonomer. Usually, styrene is included at low levels, e.g., below 5% by weight. High levels of styrene in the pressure-sensitive adhesive formulation lead to unacceptably high Tg of the pressure-sensitive adhesive polymer. Such high levels of styrene adversely affect loop tack in the PSA. Accordingly, the ability to incorporate an amount of styrene via copolymerization into the pressure-sensitive adhesive polymer equal to that where the pressure-sensitive adhesive formulation is polymerized in the presence of styrene containing polymer as in the hybrid composite is not an acceptable option.

The pressure-sensitive adhesive formulation is designed to lead to a hybrid composite having a Tg of $-25°$ C. to $-90°$ C., preferably $-40°$ C. to $-75°$ C. and a loop tack adhesion value greater than 1 pound per linear inch (pli); preferably greater than 1.5 pli, according to Pressure-sensitive Test Council (PSTC) test method PSTC-5, tested on stainless steel panel. Even though the Tg is not as well defined as in a single polymer, the Tg of the composite affords an approximation.

Polymerization of the seed latex, as well as the pressure-sensitive adhesive formulation can be initiated by thermal initiators or by a redox system. A thermal initiator is typically used at temperatures at or above about 70° C. and redox systems are preferred at temperatures below about 70° C. The amount of thermal initiator used in the process is 0.1 to 3 wt %, preferably not more than about 0.5 wt %, based on total monomers. Thermal initiators are well known in the emulsion polymer art and include, for example, ammonium persulfate, sodium persulfate, and the like. The amount of oxidizing and reducing agent in the redox system is about 0.1 to 3 wt %. Any suitable redox system known in the art can be used; for example, the reducing agent can be a bisulfite, a sulfoxylate, ascorbic acid, erythorbic acid, and the like. The oxidizing agent can include hydrogen peroxide, organic peroxide such as t-butyl peroxide, persulfates, and the like.

Chain transfer agents, well known in the aqueous emulsion polymerization art; are typically used but are not required. Examples include dodecyl mercaptan, mercaptocarboxylic acids, and esters of mercaptocarboxylic acid. The chain transfer agent is added at levels of about 0.01 to 0.5 wt %, preferably 0.02 to 0.15 wt %, based on the weight of monomers.

Effective emulsion polymerization reaction temperatures range from about 50 to about 100° C. depending on whether the initiator is a thermal or redox system.

The emulsifying agents which are suitably used are typically anionic, nonionic or blends thereof. Suitable nonionic emulsifying agents include polyoxyethylene condensates. Polyoxyethylene condensates may be represented by the general formula: $R-(CH_2CH_2O-)_nH$ where R is the residue of a fatty alcohol containing 10 to 18 carbon atoms, an alkylphenol, a fatty acid containing 10 to 18 carbon atoms, an amide, an amine, or a mercaptan, and where n is an integer of 1 or above. The Igepal surfactants are members of a series of alkylphenoxy-poly(ethyleneoxy)ethanols having alkyl groups containing from about 7–18 carbon atoms, and having from about 4 to 100 ethyleneoxy units, such as the octylphenoxy poly(ethyleneoxy)ethanols, nonylphenoxy poly(ethyleneoxy)ethanols, and dodecylphenoxy poly(ethyleneoxy)ethanols. Examples of nonionic surfactants include polyoxyalkylene derivatives of hexitol (including sorbitans, sorbides, mannitans, and mannides) anhydride, partial long-chain fatty acid esters, such as polyoxyalkylene derivatives of sorbitan monolaurate, sorbitan monopalmitate, sorbitan monostearate, sorbitan tristearate, sorbitan monooleate and sorbitan trioleate.

Suitable anionic emulsifying agents include the monovalent salts of the sulfates of the above mentioned nonionics, mono or disodium salts of sulfosuccinates half esters or diesters, sodium salts of alkylbenzene sulfonates. A single emulsifying agent can be used, or the emulsifying agents can be used in combination. When combinations of emulsifying agents are used, it is advantageous to use a relatively hydrophobic emulsifying agent in combination with a relatively hydrophilic agent. A relatively hydrophobic agent is one having a cloud point in 1% aqueous solution below 190° F. (88° C.) and a relatively hydrophilic agent is one having a cloud point in 1% aqueous solution of 190° F. (88° C.) or above. The concentration range of the total amount of emulsifying agents useful is from 0.5 to 5% based on the aqueous phase of the latex regardless of the solids content. The surfactant package is typically used in an amount of from 2 to 7 wt % of the emulsions.

An alkaline buffering agent of any convenient type that is compatible with the stabilizing agent may be used if it is desired to maintain the pH of the system at a desired value. The amount of buffer is generally about 0.1 to 0.5 wt % based on the monomers.

The following examples are intended to illustrate embodiments or the invention and are not intended to restrict the scope thereof.

EXAMPLE 1

Pressure-sensitive Acrylic With 20% Polystyrene Dissolved and Then Emulsified Polymerization Procedure Emulsion polymerization of a pressure-sensitive adhesive was carried out in conventional manner. More specifically, a 1 gallon reactor was purged with nitrogen and then an "Initial Charge" including a fraction of the monomers employed in the pressure-sensitive adhesive was added. The contents were heated to 80° C. Polymerization of the monomers in the initial charge were effected by the addition of a 2.73% solution of sodium persulfate (1.75 ml) over 10 minutes at a rate of 0.175 g/min.

A polymerizable emulsion mix was formed by mixing the "Pressure-Sensitive Adhesive Formulation" with the "Emulsifier" in a high shear mixer. After initiation, the initiator, polymerizable emulsion mix, and buffer were added over a period of about 4 hours. After addition of the initiator and polymerizable emulsion mix, the reaction was maintained for an additional 15 min at 80° C. The reaction contents were cooled to 75° C. and 2 ml of 1% iron was added. To finish the reaction, redox delays were added, initially 4 ml of each was added, and the reaction held for 30 min. This procedure was repeated as necessary until the free monomer was reduced to below 0.1%.

| Initial Charge | |
| --- | --- |
| Component | Amount (g) |
| 1. DI water | 44.3 |
| 2. Sodium pyrophosphate 3% | 42.3 |
| 3. Emulsifier K30 (29.9%) | 0.317 |
| 4. Aerosol A102 (32%) | 2.45 |
| 5. 2-Ethylhexyl acrylate | 28.05 |
| 6. Acrylic acid | 0.15 |
| 7. Styrene | 0.68 |
| 8. Methyl methacrylate | 2.8 |

K30 is a sodium alkane sulfonate
Aerosol A102 is a disodium ethoxylated alcohol half ester of sulfosuccinic acid

| Pressure-Sensitive Adhesive Formulation | | |
| --- | --- | --- |
| Component | % Component | Amount (g) |
| Methyl methacrylate | 1.74 | 10.45 |
| 2-Ethylhexyl acrylate | 72.7 | 436.25 |
| Acrylic acid 97% | 0.39 | 2.34 |
| Styrene | 1.48 | 8.89 |
| Vinyl acetate | 2.08 | 12.48 |
| Polystyrene | 20 | 120 |
| 2-Hydroxypropyl acrylate | 1.6 | 9.59 |
| Total | 100 | 600 |

| Emulsifier | |
| --- | --- |
| Component | g |
| 1. D.I. water | 282 |
| 2. Sodium Vinyl Sulfonate. (25% nv) | 10.32 |
| 3. Aerosol A102 (32% nv) | 19.00 |
| Total | 311.32 | nv = non-volatiles

| Initiator | |
| --- | --- |
| 1. DI water | 91 g |
| 2. sodium persulfate | 9 g |
| Total | 100 g |

| Buffer | |
| --- | --- |
| 1. di water | 38.36 g |
| 2. sodium citrate | 11.64 g |
| Total | 50 g |

| Redox Delays | |
| --- | --- |
| 1. DI. Water | 62.61 g |
| 2. t-BHP (70%) | 1.08 g |
| 1. DI water | 62.42 g |
| 2. SFS | 0.61 g |

Used 2 ml of a 1% ferrous sulfate solution.
t-BHP is tert-butyl hydroperoxide and SFS is sodium formaldehyde sulfoxylate.

| Final Properties of Pressure-Sensitive Adhesive | |
| --- | --- |
| pH | 5.0 |
| % solids | 55.2 |
| Viscosity at 20 rpm, #2 spindle | 170 cps |

EXAMPLE 2

Pressure-sensitive Adhesive Formulation Polymerized in the Presence of Polystyrene Seed Latex Polymerization Procedure The polymerization procedure of Example 1 was followed. In general terms the following steps were implemented:

1. Reactor was purged with nitrogen.
2. First stage: added initial charge consisting essentially of styrene as the monomer and heated to 78° C. Added initiator (9% solution of sodium persulfate ) 4.4 grams. Waited for exotherm. In this first stage, a polystyrene seed latex was formed.
3. After the first stage and the formation of polystyrene seed latex, the initiator (3.6%), buffer, and polymerizable emulsion mix were added over about 4 hours.
4. After the addition of the polymerizable emulsion mix, the reaction product was heated for an additional hour at 90° C.
5. When the reaction was complete, the free monomer was checked. The reaction product was cooled to 75° C. and post-treated with the redox delays to reduce the free monomer to below 0.1%.

| Initial Charge: Polystyrene seed latex formation | |
| --- | --- |
| Material | g |
| DI water | 290 |
| Versene 220 | 0.768 |
| Emulsifier K30 (29.9%) | 1.4 |
| Genopol 1879 (40%) | 9.3 |
| Sodium bicarbonate | 0.06 |

-continued

| Initial Charge: Polystyrene seed latex formation | |
|---|---|
| Material | g |
| Styrene | 123.9 |
| Total | 425.428 |

Versene 220 is ethylene diamine tetraacetic acid.

Genopol 1879 is a branched alkyl ethoxylate.

| Pressure-Sensitive Adhesive Formulation | | |
|---|---|---|
| Monomer | % Monomer | Amount, g |
| Methyl methacrylate | 1.78 | 12.64 |
| 2-Ethylhexyl acrylate | 81.43 | 571.72 |
| Acrylic acid 97% | 0.51 | 3.58 |
| Styrene | 1.78 | 12.50 |
| Vinyl acetate | 5.29 | 37.14 |
| 2-Hydroxypropyl acrylate | 2.03 | 14.25 |
| Butyl acrylate | 7.18 | 50.41 |
| Total | 100 | 702.24 | also includes 0.16 grams dodecyl mercaptan (DDM) 220 ppm

| Emulsifier | | |
|---|---|---|
| Component | | Amount, g |
| D.I. water | | 114.5 |
| Sodium vinyl sulfonate | (25% v) | 17.53 |
| Disponil FES 32 (30% nv) | (30% nv) | 32.48 |
| Aerosol A102 | (32% nv) | 3.03 |
| Total | | 167.54 |

Disponil FES 32 is a sodium salt of a fatty alcohol polyglycol ether sulfate.

| Initiator | |
|---|---|
| 1. DI Water | 96.4 g |
| 2. Sodium persulfate | 3.6 g |
| Total | 100 g |
| Buffer | |
| 1. DI water | 46.12 g |
| 2. Sodium citrate | 14.0 g |
| Total | 60.12 g |
| Redox Delays | |
| 1. DI. Water | 33.9 g |
| 2. t-BHP (70%) | 1.08 g |
| 1. DI water | 34.39 g |
| 2. SFS | 0.61 g |
| 3. Iron (ferrous sulfate) solution; 2 ml of 1% solution; mixed in first | |

| Final Properties of Pressure-Sensitive Adhesive | |
|---|---|
| pH | 4.5 |
| % solids | 57.3 |
| Viscosity at 20 rpm, #3 spindle | 950 cps |

EXAMPLE 3

Evaluation of Pressure-sensitive Adhesive

The emulsions of Examples 1 and 2 were used to form the various test samples and were compared to emulsion blends which consisted of a pressure-sensitive adhesive latex having the formulation of Example 1 or Example 2 (pressure sensitive adhesive formulation only) and a polystyrene latex. The latex samples were adjusted to a pH of 7. The emulsions were directly coated onto 2 ml Mylar at a coat weight of 25 g/m². The resulting tapes were applied to various substrates, e.g., stainless steel (SS) and low density polyethylene (LDPE), and evaluated for peel strength. Some of the samples were evaluated for shear based upon a test where a ½ inch film square was exposed to a 500 gram weight (referred to as ½×½×500) and another where a 1 inch square was exposed to a 1000 gram weight and evaluated (referred to as 1×1×1000). Another test was the measured peel to corrugated cardboard test conducted at 35° F. (2° C.) or 20° F. (−7° C.); referred to as 35 CC and 20 CC, respectively. (The sample preparation and test methods used to evaluate the adhesives or coatings in the examples were based on industry standard tests. They are described in publications of the Pressure Sensitive Tape Council (PSTC), Glenview, Ill.) The results are presented in Tables 1–5.

TABLE 1

| | Peel SS (pli) | Peel LDPE (pli) | Peel 35 CC (pli) | Shear ½ × ½ × 500 |
|---|---|---|---|---|
| Example 1 | 2.5 | 1.25 | 0.83 | 2 |
| 15% Blend | 1.45 | 0.92 | 0.92 | 1 |
| 30% Blend | 1.36 | 0.98 | 0 | 1.9 |
| Control | 2.4 | 1.15 | 2.2 | 0.5 | pli = pounds per linear inch

Table 1 compares the hybrid composite latex of Example 1 with the method of latex blending, i.e., blending of a polystyrene latex with a control pressure-sensitive adhesive (same monomer composition as set forth in the pressure-sensitive adhesive formulation as in Example 1). The pressure-sensitive adhesive formulation alone was referred to as the "control" and blends of 15% and 30% polystyrene by weight were compared. As can be seen from Table 1, the polystyrene, whether as a composite or blend, and even though deemed a filler, maintains pressure-sensitive adhesive performance properties of the control pressure-sensitive adhesive. The Example 1 PSA compares favorably with the control in every area except low temperature peel, i.e., 35 CC. It is substantial equal to 35 CC peel for the 15% blend and significantly better than the 30% blended sample.

If styrene were copolymerized into the pressure-sensitive adhesive at a 20% level, that would increase the Tg by about 20° C. It would be like raising the Tg of the PSA from −60° C. to 40° C. That result would adversely affect the loop tack and possibly other properties of the pressure-sensitive adhesive.

Table 2 shows results using three sources of polystyrene. Samples A, B and C were prepared in accordance with Example 1. Sample A used a high molecular weight commercial polystyrene, sample B employed a low molecular weight commercial polystyrene, and Sample C used polystyrene beverage cups dissolved in monomer.

TABLE 2

|   | Peel SS (pli) | Peel LDPE (pli) | Peel 35 CC (pli) | Shear 1 × 1 × 1000 |
|---|---|---|---|---|
| A | 2.5 | 1.25 | 0.83 | 25 |
| B | 2.4 | 1.5 | 0.85 | 36 |
| C | 2.2 | 1.4 | 0.85 | 74 |

All samples gave performance properties that were very similar thus illustrating that the performance properties were not greatly influenced by the differing polystyrene polymers employed.

Table 3 compares results of the hybrid composite of Example 1 including polystyrene, a control of PSA alone, and Example 1 composite with tackifier.

TABLE 3

|   | Peel SS (pli) | Peel LDPE (pli) | Peel 35 CC (pli) | Shear 1 × 1 × 1000 |
|---|---|---|---|---|
| Example 1 | 2.5 | 1.25 | 0.83 | 25 |
| Example 1 + Tackifier A | 4 | 3 | 1.1 | 27 |
| Control | 2.4 | 1.15 | 2.2 | 7 |

As expected, addition of tackifier resin improved the peel values of the hybrid composite of Example 1 with little effect on shear.

In summary, the results show that the method of incorporating a styrene containing polymer, e.g., a polystyrene filler into a pressure-sensitive adhesive formulation thereby forming a hybrid composite latex is suitable for PSA applications. Performance is not adversely affected, and cost is reduced.

In the preferred method of preparation, i.e., polymerizing the pressure-sensitive adhesive formulation in the presence of a polystyrene seed latex, the polymer filler has an overall positive impact on performance properties and cost. Performance results for the latex made by example 2, compared with a PSA control and a blend of PSA with polystyrene latex, are shown in Table 4.

TABLE 4

|   | Peel CC (pli) | Peel LDPE (pli) | Peel 20 CC (pli) | Shear 1 × 1 × 1000 |
|---|---|---|---|---|
| Example 2 | 1.1 | 2 | 1.1 | 7.9 |
| 20% Blend | 0.58 | 1.2 | 0.95 | 15.2 |
| Control | 1.4 | 0.9 | 0.9 | 6.5 |

The preferred example shows some differentiation from the latex blend and is more like the PSA control. As in Table 3, addition of a tackifying resin to the 20% blend will improve peel on LDPE and corrugated, Table 5. In fact, the performance of the example 2 latex compares favorably with both the tackified blend and a tackified general purpose commercial label adhesive, Table 5.

TABLE 5

|   | Peel CC (pli) | Peel LDPE (pli) | Peel 20 CC (pli) | Shear 1 × 1 × 1000 |
|---|---|---|---|---|
| Example 2 | 1.1 | 2 | 1.1 | 7.9 |
| 20% Blend + Tackifier A | 1.2 | 2 | 1.1 | 4.9 |
| Tackified Commercial GP | 1.0 | 2.6 | 0.85 | 26 |

What is claimed is:

1. In a method for preparing an aqueous emulsion of a pressure-sensitive adhesive based upon acrylic esters having a good balance of adhesive and cohesive properties wherein a pressure-sensitive adhesive formulation comprised of at least one ester of acrylic or methacrylic acid is polymerized in the presence of water and an emulsifier thereby forming an emulsion polymerized pressure-sensitive adhesive polymer, the improvement which comprises effecting the polymerization of said pressure-sensitive adhesive formulation comprised of at least one ester of acrylic or methacrylic acid in the presence of a styrene containing polymer containing at least 80 percent by weight styrene, said styrene containing polymer incorporated in an amount of from 5 to 30 percent by weight based upon the combined weight of said pressure-sensitive adhesive formulation and said styrene containing polymer.

2. The method of claim 1 wherein the styrene containing polymer is present in an amount from 10 to 20 percent by weight.

3. The method of claim 2 wherein said aqueous pressure-sensitive adhesive has a Tg of from 45° C. to 75° C.

4. The method of claim 3 wherein the pressure-sensitive adhesive formulation is polymerized in the presence of a polystyrene latex as the styrene containing polymer.

5. The method of claim 4 wherein the pressure-sensitive adhesive includes polymerized units of least one ester of acrylic or methacrylic acid selected from the group consisting of a $C_1$ to $C_8$ alkyl acrylate and a $C_1$ to $C_8$ alkyl methacrylate.

6. The method of claim 5 wherein said $C_1$ to $C_8$ alkyl acrylate and $C_1$ to $C_8$ alkyl methacrylate is selected from the group consisting of methyl methacrylate and 2-ethylhexyl acrylate.

* * * * *